United States Patent [19]
Wagner

[11] Patent Number: 5,917,624
[45] Date of Patent: Jun. 29, 1999

[54] METHOD AND SYSTEM FOR APPLYING FIBER TO THE CURB ARCHITECTURE USING A BROADBAND GATEWAY AT SERVICE LOCATIONS, INCLUDING HOMES

[75] Inventor: Stuart S. Wagner, High Bridge, N.J.

[73] Assignee: Bell Communications Research, Inc., Morristown, N.J.

[21] Appl. No.: 08/693,732

[22] Filed: Aug. 7, 1996

[51] Int. Cl.[6] .................................................. H04J 14/02
[52] U.S. Cl. .............................. 359/125; 379/379; 348/7; 455/3-1
[58] Field of Search ..................... 359/125–126, 359/137, 118, 167, 123, 173; 348/7; 379/379; 455/3–1, 19

[56] References Cited

U.S. PATENT DOCUMENTS

| 5,301,050 | 4/1994 | Czerwiec et al. | 359/125 |
| 5,303,229 | 4/1994 | Withers et al. | 359/125 |
| 5,576,874 | 11/1996 | Czerwiec et al. | 359/123 |
| 5,592,540 | 1/1997 | Beveridge | 348/7 |

*Primary Examiner*—Kinfe-Michael Negash
*Attorney, Agent, or Firm*—Joseph Giordano; David A. Hey

[57] ABSTRACT

A system for connecting fiber optic telecommunications and video services to individual homes using a single twisted pair or coaxial cable line between the optical network unit and each service location. The single twisted pair or coaxial cable line connects to a broadband gateway located at the home, from which both telephone lines and other services may be delivered. Under this invention, the optical network units serve solely as connection and routing points for the drop lines, with telephone, video, and other services derived through the broadband gateway.

6 Claims, 3 Drawing Sheets

METHOD AND SYSTEM FOR APPLYING FIBER TO THE CURB ARCHITECTURE USING A BROADBAND GATEWAY AT SERVICE LOCATIONS, INCLUDING HOMES

FIELD OF THE INVENTION

The present invention relates to the field fiber optics communications for telecommunications, video, and other digital services. More particularly, the present invention includes a method and system for delivering both telecommunications and video services at service locations using a single twisted pair or coaxial cable line with telephone service and other services derived at a gateway located at the service location.

BACKGROUND OF THE INVENTION

Telephone companies are currently considering a variety of different types of networks that will allow them to deliver broadband services to the home, including video transmission, high speed data, Internet access, video telephony, and other similar services. Telephone companies have available a variety of hardware options for transmitting this information, including optical fiber, coaxial cable, such as that the cable TV companies use, and twisted wire pairs that the telephone companies already have in service for telephones at most locations. Each of these architectures offer different trade-offs, and many different network manufacturers and equipment manufacturers are offering proposals for how networks should be implemented and how equipment should be manufactured to address the trade-offs.

One of the types of networks that is of particular interest to telephone companies today is fiber-to-the-curb (FTTC). FTTC architectures have received strong consideration as a broadband access platform for delivering both telecommunications and video services. Given that FTTC and hybrid fiber/coax (HFC) full-service networks tend to have similar installed first costs, telephone companies have expressed great interest in the FTTC approach, for several reasons: 1) FTTC makes more extensive use of fiber than HFC; 2) it is perceived as being more reliable than HFC; and 3) it is perceived to have greater capacity for interactive services. Further, FTTC technology is of interest to telephone companies because this technology pushes optical fiber quite far into the network, which is a benefit in terms of service capabilities. The technology can also reuse some of the twisted pair wire lines that telephone companies already have connected to homes. As a result, use of this technology can save telephone companies money and time.

The current state of the art for fiber optics transmission includes two methods, one by Broad Band Technologies (BBT) and another originally developed by a company called Next-Level Communications (NLC).

BBT Method

The BBT method, which is generally referred to as switched digital video architecture, provides service through a large optical network unit (ONU) serving 16 to 32 service locations (e.g., homes or living units) or more and relies on long lengths of metallic distribution and drop cables to reach individual service locations. The ONU is a curbside or phone-pole located pedestal that takes the signal from the optical fiber and demultiplexes it into many different services and streams, which may then be distributed to service locations.

Drawbacks of this method include the following:

long lengths of twisted-pair drops generally require the use of special modulation formats to overcome transmission impairments;

the long lengths of metallic distribution and drop cables compromise cost savings and may complicate service provisioning;

high power consumption of the large ONUs further adds to network costs;

the use of large ONUs implies that the last point of network intelligence, the ONU, is relatively far from the customer premises, which analysis shows increases operations costs compared with networks that deploy such elements nearer to the customer; and the placement of ONUs relatively far from the customer, along with the extensive use of metallic cables, may complicate longer-term evolution to a fiber-to-the-home (FTTH) architecture.

This design presents some other problems. For example, provisioning of telephone service, also known as plain old telephone service or POTS, integrated services digital network (ISDN), which is a digital service containing band width sufficient to simultaneously support both telephone lines and a low-speed signaling channel or high-speed data access such as Internet access, and other similar two-way telecommunications services require the installation of service-specific drops and ONU line cards. The resulting service-activation costs utilizing these line cards are significant.

Moreover, with the proliferation of new switched telecommunications services for data and multimedia applications, the potential for exhaustion of ONU shelf space is significant. The shelf space consists of physical locations for card plug-in within the ONU, allowing provisioning of services. As a result, with this method, the ONU serves as a bottleneck and a provisioning headache for the phone company.

For example, if a customer wants two telephone lines, a special line for ISDN, another line for video telephony, and a line for conventional entertainment video services, that customer would need a separate card installed in the ONU and a separate drop wire or coaxial cable from the ONU to the house for each service. These requirements can lead to exhaustion of both ONU shelf space and available twisted pair cables in the telephone-company distribution plant.

Finally, although these FTTC networks are relying on Asynchronous Transfer Mode (ATM) to an increasing extent to multiplex (combine signals for) different services, and often feature downstream transmission bandwidths on the order of 1 Gb/s on the fiber, they nevertheless often provide little integration between telecommunications and video services, while severely limiting the amount of bandwidth available for the former.

NLC Method

The NLC approach, which has only recently been formulated, avoids at least some of the problems with the more-traditional BBT approach. First, this proposal uses fiber optics to serve a smaller clusters of homes. So instead of 16 or 32 homes, for example, each ONU serves only about 8 homes. A second difference is that, rather than using a service-specific line card and a service specific drop wire for each individual home, the NLC approach combines all of the services other than telephony into a single line. Therefore, for example, ISDN, video telephony, other multimedia services, and video service are multiplexed onto one wire so that no matter how many lines a customer has, that customer only requires one wire for these services from the ONU to the house. Inside the house, a service-specific box takes each signal from this multiplex wire and derives a service interface. As a result, the system includes a box for ISDN, a box for video telephony, and so forth.

This second design offers advantages over the BBT approach, including the following:

the ONU creates less of a bandwidth bottleneck because, except for provisioning of POTS lines, the ONU merely demultiplexes high-speed streams from the central office and distributes them to customers; and in the upstream direction, the ONU multiplexes upstream traffic from customers and sends it over a common fiber to the central office.

The NLC approach suffers from a number of drawbacks, however, such as the following:

network intelligence remains relatively far from the customer, and as a result costs of maintenance are higher than they would be if closer to the customer (e.g., if all systems are derived at the home);

evolution to FTTH will still require eventual migration of this intelligence to the wall of the home;

ONU size and power dissipation may continue to be significant, given that that POTS lines are still derived there (i.e., power to ring each phone is supplied at the ONU); and drop-wire exhaustion may occur for those customers, requiring multiple POTS lines and broadband services simultaneously (e.g., since typically homes only receive two pairs of drop wires and the NLC approach requires one line for each telephone service and one line for all other services, a maximum of one telephone line is generally available at each home).

Compared to both of the existing proposals, the present invention has very important advantages with respect to FTTC. It is an object of the current invention to provide a new method for fiber optics-based communications to homes that utilizes a single twisted pair or coaxial cable line from the ONU to the home and a broadband gateway located at the wall of the home.

SUMMARY OF THE INVENTION

The present invention combines all services for each service location onto a single twisted pair or coaxial cable line between the ONU to the service location. All services are derived from this single line at an active gateway located at the service location. This gateway contains the intelligence to allow the phone company to do end work testing at the home and to derive all services, including telephone services, at the home. Because services are derived at the home, the ONU remains as simple as possible, with none of the problems experienced by existing designs.

Existing fiber optics FTTC designs include two types. The first type uses a pair of fiber optic lines to connect a multiplexed signal to each ONU, which serves 16 to 32 service locations. From the ONU, each service location requires a coaxial cable or twisted pair connection for each of POTS, ISDN, or other high-speed data or multimedia information.

The second existing approach to fiber optics FTTC is a relatively new design, using a single fiber optic line to connect the multiplexed signal to the ONU, with the ONU serving about eight units. A twisted-pair drop is required for each POTS, with one additional twisted-pair line necessary for all other services, which are then derived at the service location.

In contrast to the prior art, the FTTC configuration of the preferred embodiment uses smaller, simplified ONUs. Further, in the preferred embodiment, the ONUs derive no services. Instead, each ONU merely acts as a connection and routing point between the fiber optic line and the service locations, converting the optical signal to an electronic signal, distributing that same signal to each home served by the ONU, and combining and converting to fiber optic signal the signals from each service location.

A broadband gateway device on the outside wall of each service location demultiplexes signals from the upstream direction and multiplexes signals from the downstream direction, providing a standard POTS interface and an output for connecting to other in-home communications terminals (e.g., set-top boxes, broadband modems).

The invention thus has a number advantages over the two current FTTC/FV designs. The gateway places network intelligence as close to the customer as possible, thus reducing both service-activation and service-assurance costs. In addition, except for its electronic front end, the gateway performs essentially the same functions as a FTTH ONU, thus simplifying eventual migration to FTTH.

Another advantage is that the ONU's size and power dissipation have been minimized. In fact, it may be possible to eliminate the entire telephone-company powering network facility; the gateway could be customer-powered, while the ONU could be powered via backfeeding over a customer drop or via solar powering. Both the gateway and ONU could be backed up by internal batteries. The simplicity and minimal power dissipation of the ONU design greatly facilitate the use of backfed or solar powering and internal battery backup.

Further, the connection between the ONU and each gateway requires only a single twisted pair or coaxial cable line, regardless of how many POTS lines the customer needs. If two twisted pair drops are available (as they usually are), the ONU to gateway connection could use both, potentially simplifying transmission, and increasing capacity over the drop. In addition, simplification of the functions of the ONU allows it to be smaller and simpler, with little worry about shelf space.

The preferred embodiment thus uses a broadband gateway as a means of accommodating multiple service providers, amplifying signals prior to entrance into the home, and governing multiple access within customer premises networks (CPN). The gateway can explicitly provide each service interface at the side of the house, or the gateway can merely act as an interface to an integrated CPN. With an integrated CPN, a coaxial cable network running within the house would carry an integrated stream of information to the different terminals.

As noted, the gateway handles both traffic flowing from the network to the customer and traffic in the opposite direction from the customer to the network. For example, in the downstream direction (signals flowing towards the customers house) the gateway would use a high speed bitstream at some standardized bit rate such as 25 to 50 megabits per seconds. That bitstream would contain visual information for entertainment video, information for telephone signals, the ISDN bitstream, and anything else that the customer wants. The bitstream uses ATM, a technology allowing combination of these widely varying types of data streams.

The gateway separates from the bitstream the individual components associated with each different service. The gateway accomplishes this by using a demultiplexer to separate individual streams, which are then processed by individual circuits. One possible implementation of the gateway would provide separate, standard interfaces for two POTS lines and one ISDN line, and would also provide a coaxial-cable interface for in-home distribution of video and other high-speed multimedia services.

In the upstream direction, the gateway takes the variety of signals coming from the home (e.g., telephone, ISDN) and multiplexes them together so that they can be transmitted over the common drop wire, in an integrated, multiplexed fashion. The combined signal again uses ATM.

If the gateway provides telephone service, another issue arises with respect to how the gateway is powered. Telephone activation power, such as ringing, can be provided by the customer from a commercial power source. However, because customers generally expect telephone service to continue even when commercial power fails, the gateway is likely to contain a battery to help keep the gateway powered during a local power outage.

Additional objects, advantages and novel features of the invention will be set forth in part in the description which follows, and in part will become more apparent to those skilled in the art upon examination of the following or may be learned by practice of the invention. The objects and advantages of the invention may be realized and attained by means of the instrumentalities and combinations particularly pointed out in the appended claims.

To achieve the stated and other objects of the present invention, as embodied and described below, the invention may comprise the steps of:

receiving multiplexed fiber optic digital information from a fiber optic line at an ONU;

converting the multiplexed fiber optic digital information into multiplexed electronic digital information at the ONU;

distributing at the ONU the multiplexed electronic digital information for transmission to multiple service locations;

communicating the multiplexed electronic digital signal to a gateway located at each service location over a single twisted pair or coaxial cable line;

demultiplexing the multiplexed electronic digital information at each gateway;

sending the demultiplexed information to service interfaces at the service locations;

multiplexing within the gateway electronic digital information transmitted from the service location;

transmitting the multiplexed electronic digital information from each gateway to the ONU;

multiplexing the multiplexed electronic digital information from the combined service locations;

converting combined multiplexed electronic digital information into multiplexed fiber optic digital information; and transmitting the multiplexed fiber optic digital information through the fiber optic line.

DETAILED DESCRIPTION OF THE PREFERRED EMBODIMENT

Using the drawings, the preferred embodiment of the present invention will now be explained.

Figure 1:
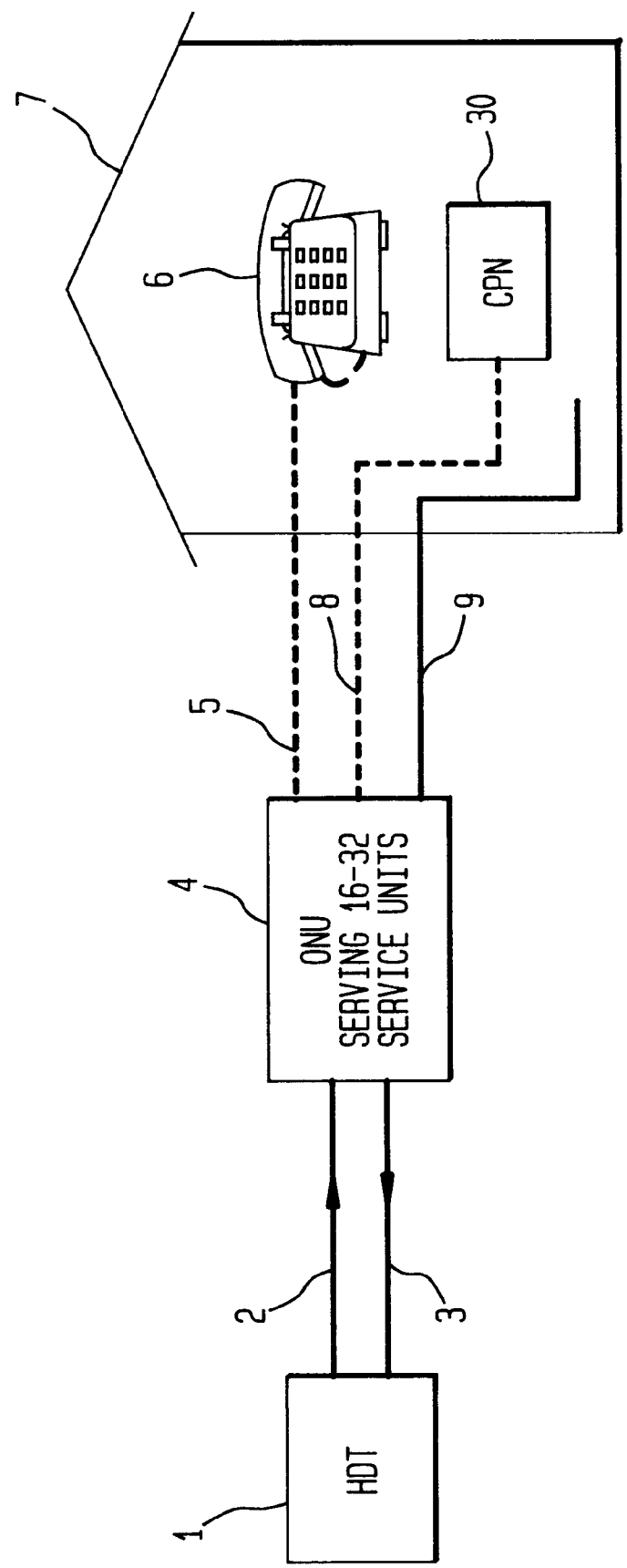
FIG. 1 contains a diagram of the most common method of state of the art fiber optic communication for telecommunications and video services.

FIG. 1 shows a diagram of one of the two prior art methods for transferring fiber optic data to the home, commonly referred to as switched digital video architecture. A telephone company or other signal source, generally referred to as a host digital terminal (HDT) 1, transmits a fiber optic signal 2 to and receives a fiber optic signal 3 from an ONU 4. The ONU 4 demultiplexes the fiber optic signal for 16 to 32 homes and for each home channels a signal for POTS through a twisted pair line 5 for connection to a telephone 6 located within the home 7 and channels the signal for each other service through separate twisted pair 8 and coaxial cable lines 9 for connections to customer provided networks (CPN) 30 within the home 7. The same system elements allow transmission of a signal from the home 7 back to the telephone company or other signal receptor 1.

Figure 2:
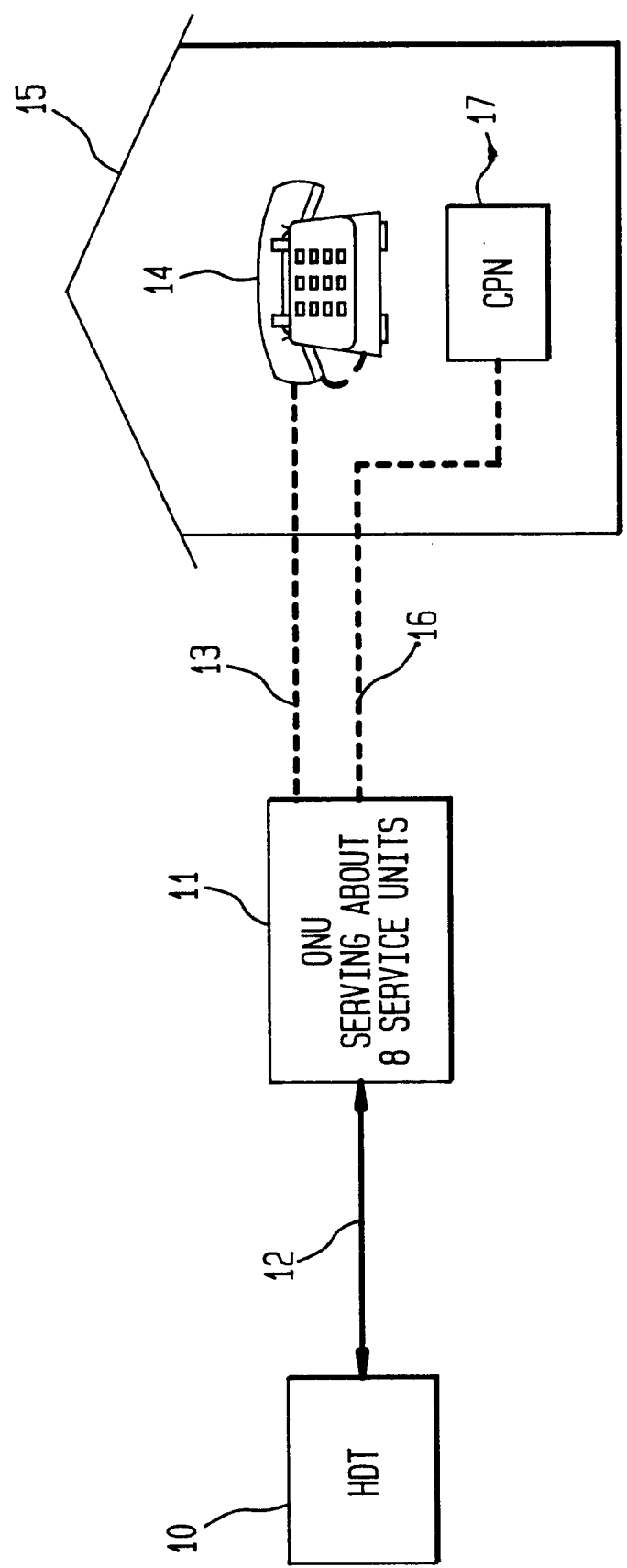
FIG. 2 provides a description of a second existing method in state of the art fiber optic communications.

FIG. 2 shows a diagram of the second of the two prior art methods for transferring fiber optic data to the home. With this method, an HDT 10, transmits to and receives from an ONU 11 a fiber optic signal 12 from a bidirectional single fiber. The ONU demultiplexes the signal for eight homes into a POTS signal and a multiplexed second signal for all other services for each home. The POTS signal is channeled via a twisted pair line 13 for connection to a telephone 14 within the home 15. The remaining multiplexed signals are channeled through a second twisted pair line 16 to a customer provided network (CPN) 17 within the home 15. The same system elements allow transmission of a signal from the home 15 back to the telephone company or other signal receptor 10.

Figure 3:
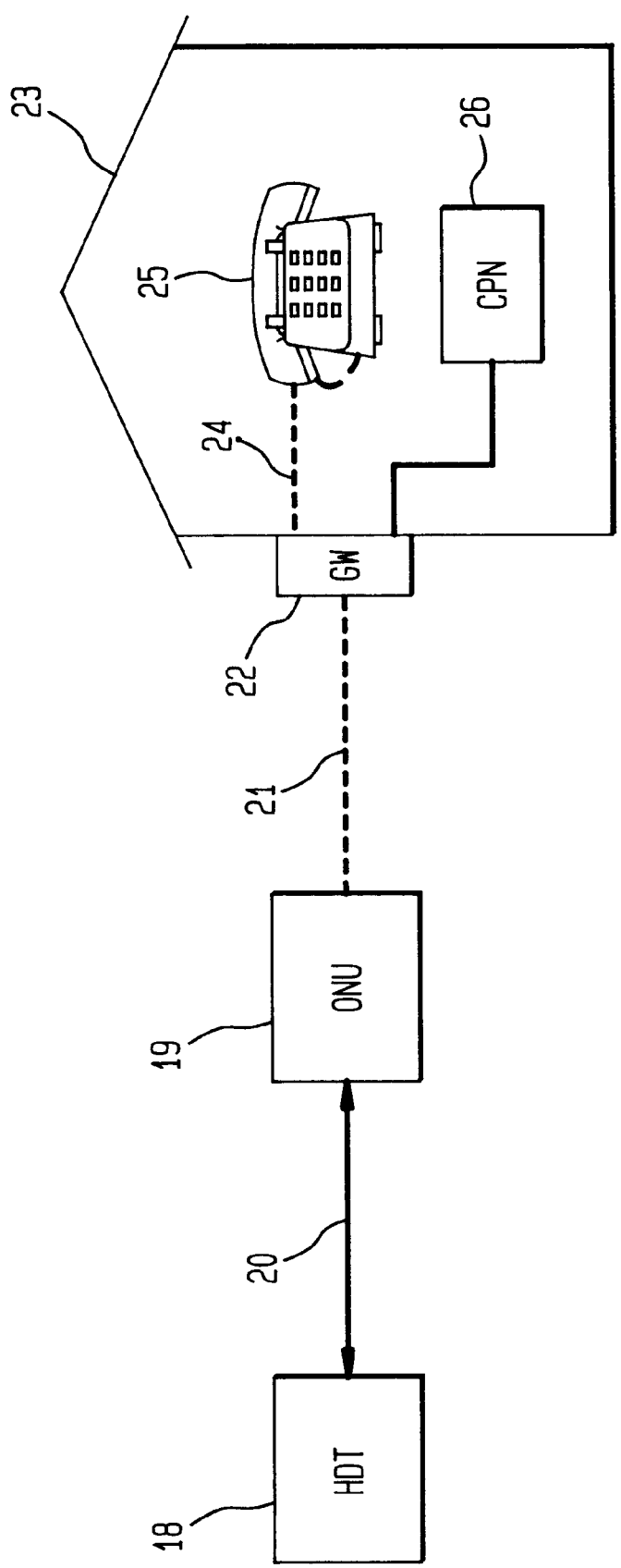
FIG. 3 shows the preferred embodiment, demonstrating a new method for fiber optic communication for telecommunications and video services.

FIG. 3 demonstrates the method of the preferred embodiment. An HDT 18, transmits to and receives from an ONU 19 a fiber optic signal 20 using either a one-fiber, bidirectional or two-fiber unidirectional transmission. The ONU 19 channels the multiplexed signal through a single twisted pair line 21 to a gateway (GW) 22 located at the home 23. The gateway 22 demultiplexes the signal, providing one or more POTS interfaces, which can be connected 24 to telephone(s) 25 within the home 23. The gateway 22 either provides a connection point for the remaining multiplexed signals or provides separate connections for each of the remaining signals after demultiplexing. These signals are then connected customer premises network (CPN) 26 within the home 23. The same system elements allow transmission of a signal from the home 23 back to the telephone company or other signal receptor 18.

What is claimed is:

1. A method for communicating digital information between a fiber optic line and a service location for different services as electronic digital information at the service location, said method comprising the steps of:

receiving combined fiber optic digital information from the fiber optic lines and converting said combined fiber optic digital information into combined electronic digital information at a combining and distributing unit;

transmitting said combined electronic digital information to a gateway located at a service location; and at the gateway, uncombining at least some of said combined electronic digital information and sending the combined and uncombined electronic digital information separately to a telephone and a customer provided network terminal at the service location.

2. The method in accordance with claim 1 further comprising the steps of:

combining within the gateway uncombined and combined electronic digital information from the telephone and the customer provided network terminal at the service location and transmitting the thus combined electronic digital information to the combining and distribution unit; and at the combining and distributing unit, converting the combined electronic digital information from the service location into combined fiber optic digital information and transmitting the combined fiber optic digital information onto the fiber optic line.

3. The method in accordance with claim 1 wherein said combining comprises multiplexing.

4. The method in accordance with claim 1 wherein said uncombining comprises demultiplexing.

5. A system for communicating digital information between a fiber optic line and a service location for different services as electronic digital information at the service location, said system comprising:

a combining and distributing unit comprising means for receiving multiplexed fiber optic digital information from the fiber optic line, for converting said multiplexed fiber optic digital information into multiplexed electronic digital information, and for transmitting said multiplexed electronic digital information; and a gateway at the service location coupled to said combining and distributing unit, said gateway comprising means for demultiplexing a portion of said multiplexed electronic digital information received from said combining and distributing unit, and for sending the demultiplexed and the multiplexed electronic digital information to different service units at the service location.

6. The system in accordance with claim 5 wherein said service units at the service location include a telephone for receiving the demultiplexed electronic digital information and a customer premises network for receiving multiplexed electronic digital information.

* * * * *